(12) United States Patent
Mathias et al.

(10) Patent No.: US 9,074,864 B2
(45) Date of Patent: Jul. 7, 2015

(54) DEVICE AND METHOD RELATING TO A SENSING DEVICE

(71) Applicant: Orbital ATK, Inc., Dulles, VA (US)

(72) Inventors: Edward C. Mathias, North Logan, UT (US); John L. Shipley, Tremonton, UT (US)

(73) Assignee: ALLIANT TECHSYSTEMS INC., Arlington, VA (US)

( * ) Notice: Subject to any disclaimer, the term of this patent is extended or adjusted under 35 U.S.C. 154(b) by 12 days.

(21) Appl. No.: 14/095,775

(22) Filed: Dec. 3, 2013

(65) Prior Publication Data
US 2014/0130603 A1 May 15, 2014

Related U.S. Application Data

(63) Continuation of application No. 12/833,894, filed on Jul. 9, 2010, now Pat. No. 8,596,137.

(51) Int. Cl.
| | |
|---|---|
| *G01L 3/20* | (2006.01) |
| *G01L 3/00* | (2006.01) |
| *G01L 1/00* | (2006.01) |
| *G01M 5/00* | (2006.01) |
| *G01B 5/20* | (2006.01) |
| *G01B 7/16* | (2006.01) |

(Continued)

(52) U.S. Cl.
CPC .. *G01B 5/20* (2013.01); *G01B 7/16* (2013.01); *A63F 13/06* (2013.01); *F02K 9/346* (2013.01)

(58) Field of Classification Search
CPC ............... A61B 2562/0261; A61B 2562/164; G01B 7/18; G01L 1/205; G01L 1/22; G01N 2203/0023

USPC .............. 73/849, 788, 862.381, 802; 702/155
See application file for complete search history.

(56) References Cited

U.S. PATENT DOCUMENTS

| | | |
|---|---|---|
| 4,882,937 A | 11/1989 | Leon |
| 4,922,096 A | 5/1990 | Brennan |

(Continued)

FOREIGN PATENT DOCUMENTS

WO 2010015274 2/2010

OTHER PUBLICATIONS

Dotson, K.W., et al., Vortex Shedding in a Large Solid Rocket Motor Without Inhibitors at the Segment Interfaces, Journal of Propulsion and Power, Mar.-Apr. 1997, pp. 197-206, vol. 13, No. 2, American Institute of Aeronautics and Astronautics.

(Continued)

*Primary Examiner* — Lisa Caputo
*Assistant Examiner* — Jonathan Dunlap
(74) *Attorney, Agent, or Firm* — TraskBritt

(57) ABSTRACT

Methods, devices, and systems relating to a sensing device are disclosed. A device may comprise a structure including a first surface and a second, opposite surface, wherein the structure comprises one or more segments. Further, the device may include a plurality of sensors disposed on the structure, wherein each segment of the one or more segments comprises a first sensor of the plurality of sensors coupled to the first surface and an associated second sensor of the plurality of sensors coupled to the second surface. Moreover, each sensor of the plurality of sensors may be configured to measure a strain exhibited on an adjacent surface of the structure at an associated segment of the one or more segments.

25 Claims, 11 Drawing Sheets

(51) Int. Cl.
*A63F 13/20* (2014.01)
*F02K 9/34* (2006.01)

(56) References Cited

U.S. PATENT DOCUMENTS

| | | | | |
|---|---|---|---|---|
| 5,065,631 | A | * | 11/1991 | Ashpitel et al. ............... 73/849 |
| 5,465,214 | A | * | 11/1995 | Jeuniaux et al. ............. 700/117 |
| 5,533,515 | A | | 7/1996 | Coller et al. |
| 5,665,922 | A | | 9/1997 | Tsukada et al. |
| 5,728,044 | A | | 3/1998 | Shan |
| 6,711,890 | B2 | | 3/2004 | McGuire |
| 6,966,264 | B2 | | 11/2005 | Solberg et al. |
| 7,077,011 | B2 | * | 7/2006 | Johnson et al. ............... 73/841 |
| 7,646,945 | B2 | | 1/2010 | Jones et al. |
| 7,814,801 | B2 | | 10/2010 | Inamori |
| 8,273,013 | B2 | | 9/2012 | Niwa et al. |
| 8,596,137 | B2 | | 12/2013 | Mathias et al. |
| 2003/0004439 | A1 | | 1/2003 | Pant et al. |
| 2006/0009704 | A1 | * | 1/2006 | Okada et al. ............... 600/529 |
| 2007/0270649 | A1 | | 11/2007 | Long |
| 2009/0107251 | A1 | | 4/2009 | Inamori |
| 2010/0036287 | A1 | | 2/2010 | Weber |
| 2011/0067253 | A1 | | 3/2011 | Happel |
| 2011/0307214 | A1 | | 12/2011 | Saitou et al. |

OTHER PUBLICATIONS

International Search Report, Application No. PCT/US2011/043010, mailed 7 Oct. 2011, five (5) pages.
Written Opinion of the International Searching Authority, Application No. PCT/US2011/043010, mailed Oct. 7, 2011, six (6) pages.

* cited by examiner

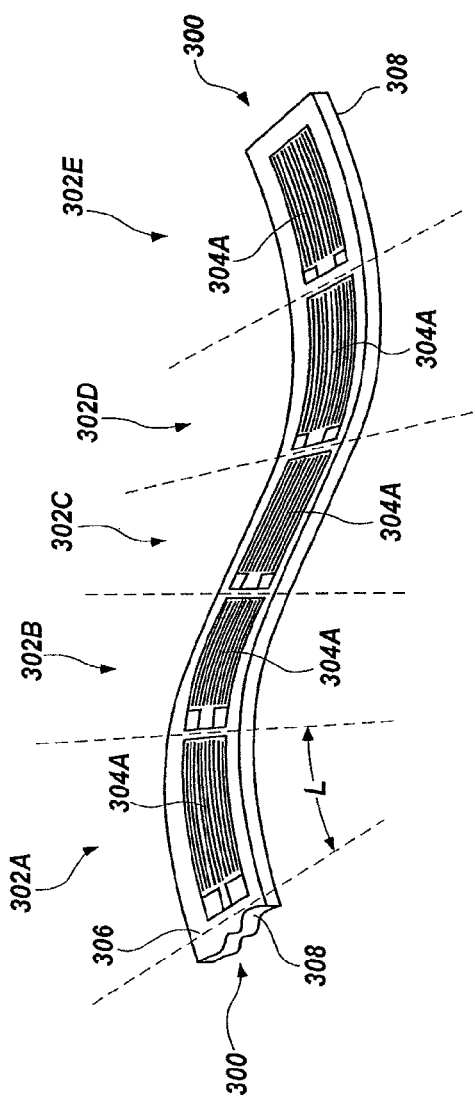
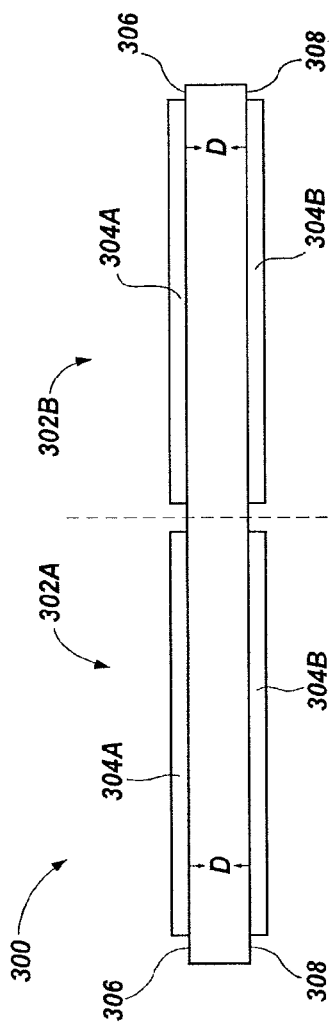

DEVICE AND METHOD RELATING TO A SENSING DEVICE

CROSS-REFERENCE TO RELATED APPLICATION

This application is a continuation of U.S. patent application Ser. No. 12/833,894, filed Jul. 9, 2010, now U.S. Pat. No. 8,596,137, issued Dec. 3, 2013, the disclosure of which is hereby incorporated herein by this reference in its entirety.

GOVERNMENT RIGHTS

The United States Government has certain rights in this invention pursuant to Contract Nos. NAS8-97238 and NNM07AA75C between the National Aeronautics and Space Administration and Alliant Techsystems Inc.

TECHNICAL FIELD

This invention, in various embodiments, relates generally to measuring one or more characteristics of an object and, more specifically, to methods, devices, and systems for determining a shape of an object.

BACKGROUND

Reusable solid rocket motor (RSRM) designs can be found in many rocketry applications, with perhaps the best-known applications involving solid rocket boosters of the Space Shuttle, or the Ares 1 rocket. The solid rocket boosters of a spacecraft may be attached to opposite sides of a main external tank of the spacecraft and, together, may furnish the majority of the thrust required to launch the spacecraft from its mobile launch platform and contribute to accelerate the vehicle to more than about 4800 km per hour (3,000 miles per hour) before detaching and separating from the external tank.

FIG. 1 is a perspective view of an example of a conventional RSRM 100 of a spacecraft vehicle. RSRM 100 comprises a plurality of detachable segments connected to each other by field joints 120 and factory joints 140. The term "field joint" is commonly used in the field of rocketry to denote joints capable of being assembled in either a factory or the field. Field joints 120 and segmented design provides maximum flexibility in transportation, handling, recovery, refurbishment, assembly, and fabrication of RSRM 100. For example, the segmenting of the solid rocket motor facilitates propellant casting procedures and permits transportation of the large segments on heavy-duty railcars incapable of carrying an assembled RSRM 100.

FIG. 2A is a partially cut-away view of a conventional RSRM comprising field joints having a pressure-actuated joint system. With reference to FIG. 2A, RSRM 100 comprises a forward segment 121, a forward-center segment 122, an aft-center segment 124, and an aft segment 126. Segments 121, 122, 124, and 126 may collectively contain a solid propellant grain structure, which is illustrated as a center-perforated propellant grain structure 145. More specifically, each of segments 121, 122, 124, and 126 houses a portion or segment of propellant grain structure 145.

FIG. 2B is a sectional view of one of the field joints shown in FIG. 2A, and in particular is a sectional view of a forward field joint 112 connecting the forward segment 121 and forward-center segment 122 of the RSRM 100 of FIG. 2A. FIG. 2C is a sectional view of another one of the field joints shown in FIG. 2A, and in particular is a sectional view of a center field joint 112a connecting the forward-center segment 122 and an aft-center segment 124 of the RSRM 100 of FIG. 2A. FIG. 2D is a sectional view of still another one of the field joints shown in FIG. 2A, and in particular is a sectional view of an aft field joint 112b connecting the aft-center segment 124 and the aft segment 126 of the RSRM 100 of FIG. 2A. FIG. 2E is a zoomed-in, enlarged view of the forward field joint 112 of FIG. 2B.

Also illustrated in FIG. 2B are inhibitors 193 and 203, each of which is shaped as an annular radial disk. With reference to FIG. 2E, inhibitors 193 and 203 are disposed on opposite sides of a channel 204, and may be applied after partial propellant cure. Inhibitors 193 and 203 may be used to thermally protect propellant grain structure 145 and control grain ignition. Inhibitors 193 and 203 may, for example, include materials such as nitrile butadiene rubber (NBR) and carboxyl-terminated polybutadiene copolymer Inhibitors 193 and 203 may also include other ingredients, for example, fillers such as asbestos. Inhibitors 193 and 203 may be designed to bond to and cure simultaneously with propellant grain structure 145.

As propellant grain structure 145 burns, portions of inhibitors 193 and 203 that remain within an aperture of RSRM 100 may cause RSRM 100 to experience undesired oscillations. More specifically, as an example, vortex shedding from inhibitor 193 or inhibitor 203 may result in oscillations in the combustion chamber of RSRM 100 that may undesirably shake an associated orbiter. Conventionally, in an effort to better understand oscillations caused by an inhibitor within a combustion chamber of a rocket motor, real-time radiography has been utilized to monitor a shape and a position of the inhibitor. However, real-time radiography has proven to be inadequate due to slow frame rate and poor resolution.

The inventors have appreciated that there is a need for enhanced methods, systems, and devices for measuring characteristics of an object and, in particular, for methods, devices, and systems for determining a shape of an object.

BRIEF SUMMARY OF THE INVENTION

An embodiment of the present invention comprises a method of determining at least one characteristic of at least a portion of an object. The method may comprise at least substantially aligning at least a portion of a sensing device including a structure having a plurality of sensors coupled thereto with at least a portion of an object. The structure may comprise one or more segments and each segment includes a first sensor of the plurality of sensors coupled to a first surface and a second sensor of the plurality of sensors coupled to a second, opposite surface. The method may further include sensing a strain with each of the first sensor and the second sensor at each segment of the one or more segments. Furthermore, the method may include determining a curvature of each segment of the one or more segments and determining at least one of a shape and a position of the at least a portion of the object from the determined curvature of each segment.

Another embodiment of the present invention comprises a method of determining a shape of an inhibitor within a rocket motor. The method may include positioning a sensing device comprising a plurality of strain gauges adjacent to and at least in substantial alignment with an inhibitor in a rocket motor. In addition, the method may include determining a shape of the inhibitor by determining a shape of the sensing device.

Another embodiment of the present invention comprises a method of determining a shape of at least a portion of an inhibitor within a rocket motor. The method comprises sensing a strain exhibited on each of a first surface and a second, opposite surface of each segment of one or more segments of a structure embedded within at least a portion of an inhibitor within a rocket motor. Additionally, the method may comprise determining a curvature of each segment of the one or more segments from an associated strain sensed on each of the first surface and the second surface. Moreover, the method may include determining a shape of the at least a portion of the inhibitor from the determined curvature of each segment of the structure.

Another embodiment of the present invention comprises a device. The device may comprise a structure including a first surface and a second, opposite surface, wherein the structure comprises one or more segments. Further, the device may include a plurality of sensors disposed on the structure, wherein each segment of the one or more segments comprises a first sensor of the plurality of sensors coupled to the first surface and an associated second sensor of the plurality of sensors coupled to the second surface. Moreover, each sensor of the plurality of sensors may be configured to measure a strain exhibited on an adjacent surface of the structure at an associated segment of the one or more segments.

Another embodiment of the present invention comprises a system. The system may comprise a device comprising a structure including a first side and a second side, opposite the first side, wherein the structure comprises a plurality of segments. The device may further include a plurality of sensors disposed on the structure, wherein each segment comprises a sensor on each of the first side and the second side. Moreover, each sensor of the plurality of sensors is configured to measure a strain exhibited on an adjacent surface of the structure at an associated segment of the one or more segments. The system may further comprise a computer operably coupled to the device and configured to receive data from each sensor of the plurality of sensors.

Yet another embodiment of the present invention includes a rocket motor. The rocket motor comprises one or more inhibitors, wherein at least one inhibitor of the one or more inhibitors includes a sensing device embedded therein. The sensing device may comprise a structure including one or more sensors disposed on a first surface, wherein each sensor of the one or more sensors disposed on the first surface is associated with a sensor of one or more sensors disposed on a second surface, opposite the first surface. Further, each sensor of the one or more of sensors is configured to measure a strain exhibited on an adjacent surface of the structure.

BRIEF DESCRIPTION OF THE DRAWINGS

In the drawings:

FIG. 4 illustrates a structure comprising a plurality of segments having a plurality of sensors coupled thereto, in accordance with an embodiment of the present invention;

FIG. 5 is another depiction of the structure of FIG. 4 comprising a plurality of segments having a plurality of sensors coupled thereto;

DETAILED DESCRIPTION OF THE INVENTION

Figure 1:
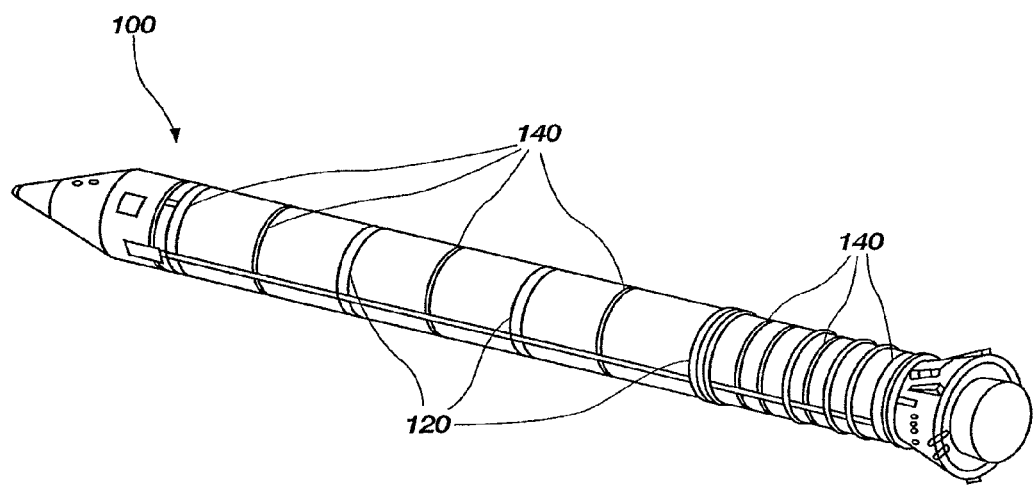
FIG. 1 is perspective view of an example of a conventional reusable solid rocket motor of a spacecraft vehicle.
Figure 2:
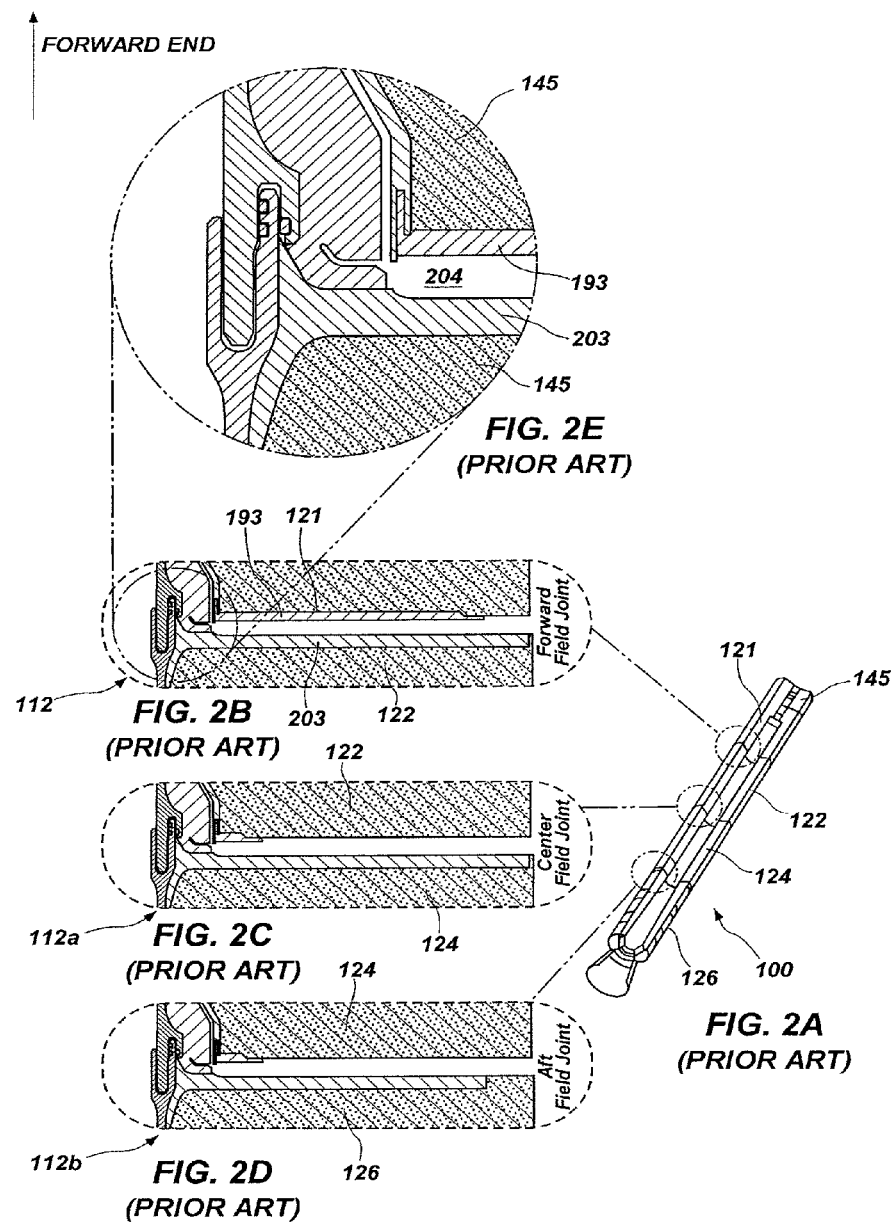
FIG. 2A is a partially cut-away view of a conventional reusable solid rocket motor comprising field joints having a pressure-actuated joint system.
FIG. 2B is a sectional view of one of the field joints shown in FIG. 2A, and in particular is a sectional view of a forward field joint connecting a forward segment and a forward-center segments of the solid rocket motor of FIG. 2A.
FIG. 2C is a sectional view of another one of the field joints shown in FIG. 2A, and in particular is a sectional view of a center field joint connecting a forward-center segment and an aft-center segment of the solid rocket motor of FIG. 2A.
FIG. 2D is a sectional view of still another one of the field joints shown in FIG. 2A, and in particular is a sectional view of an aft field joint connecting an aft-center segment and an aft segment of the solid rocket motor of FIG. 2A.
FIG. 2E is a zoomed-in, enlarged view of the forward field joint of FIG. 2B.

In the following description, circuits and functions may be shown in block diagram form in order not to obscure the present invention in unnecessary detail. Conversely, specific circuit implementations shown and described are examples only and should not be construed as the only way to implement the present invention unless specified otherwise herein. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise, a set of elements may comprise one or more elements.

In this description, some drawings may illustrate signals as a single signal for clarity of presentation and description. It will be understood by a person of ordinary skill in the art that the signal may represent a bus of signals, wherein the bus may have a variety of bit widths and the present invention may be implemented on any number of data signals, including a single data signal. In describing embodiments of the present invention, the systems and elements incorporating embodiments of the invention are described to facilitate an enhanced understanding of the function of the described embodiments of the invention as it may be implemented within these systems and elements.

When executed as firmware or software, the instructions for performing the methods and processes described herein may be stored on a computer readable medium. A computer readable medium includes, but is not limited to, magnetic and optical storage devices such as disk drives, magnetic tape, CDs (compact discs), DVDs (digital versatile discs or digital video discs), and semiconductor devices such as RAM, DRAM, ROM, EPROM, and Flash memory.

A strain gauge is a strain-sensitive device employed to sense strain, such as that caused by stress in the form of tensile or compressive forces applied to a structure. Conventional strain gauges typically employ a strain sensing element adhered to at least one surface on or within the structure such that, when the structure exhibits a strain in response to an applied stress, the resistance of the sensing element changes in proportion to the sensed strain. The measured strain is generally calculated based on the change in resistance in the sensing element as the structure is compressed or elongated, thus exhibiting or manifesting the strain. Strain gauges can be used to measure bending, axial and torsional strain, or a combination of strain effects, on a structure resulting from various applied loads.

Strain gauges may include foil type strain gauges comprising a pattern of resistive foil mounted on a backing surface. Furthermore, strain gauges may include semiconductor strain gauges, which are often preferred over foil gauges when measuring small amounts of strain. Strain gauges may be attached to a flexible plastic substrate which, in turn, is coupled (e.g., bonded) to the structure for which the strain is to be determined. As known by one having ordinary skill in the art, in order to measure a physical property with one or more coupled sensors, the sensors may be integrated within a measurement circuit configured to measure the changes in an electrical property corresponding to a change in a physical property, such as temperature or strain. For example, a strain gauge may be implemented within a Wheatstone bridge circuit, which converts the sensed resistance to a voltage signal. To obtain the voltage signal, it is generally required to further connect a differential amplifier and a current source to the Wheatstone bridge circuit. As a more specific example, a measurement circuit may include a "half-bridge" Wheatstone bridge circuit including at least two sensors configured to measure strain.

Figure 3:
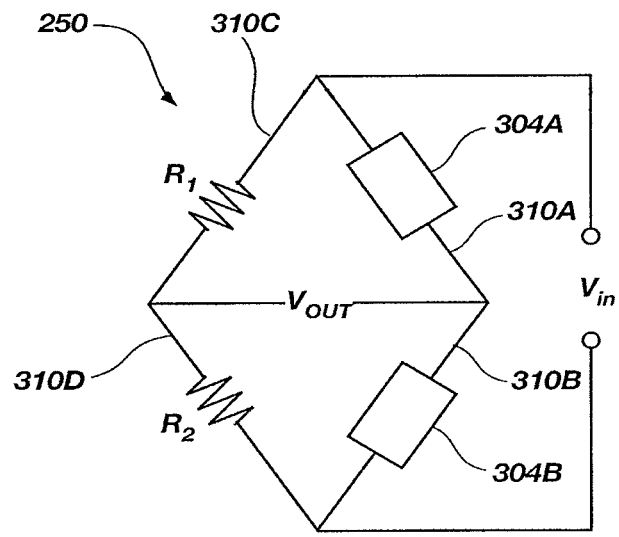
FIG. 3 illustrates a "half-bridge" Wheatstone bridge circuit.

FIG. 3 illustrates an example of a "half-bridge" Wheatstone bridge circuit 250. The Wheatstone bridge circuit 250 includes branches 310A, 310B, 310C, and 310D. First branch 310A includes a first sensor 304A, second branch 310B includes a second sensor 304B, and third branch 310C and fourth branch 310D may include resistors $R_1$ and $R_2$, respectively. For example only, and not by way of limitation, each of first sensor 304A and second sensor 304B may comprise a strain gauge. Operation of a "half-bridge" Wheatstone bridge is well known in the art and, therefore, will not be discussed in detail. It is noted, however, that Wheatstone bridge circuit 250 may be configured such that a strain associated with first sensor 304A and a strain associated with second sensor 304B may be simultaneously measured.

FIG. 4 illustrates a structure 300 comprising a plurality of segments 302A-302E having a plurality of sensors 304A coupled thereto, in accordance with an embodiment of the present invention. FIG. 5 is another depiction of a portion of the structure 300 of FIG. 4 comprising a plurality of segments 302A, 302B having a plurality of sensors coupled thereto. Referring to FIGS. 4 and 5 the structure 300 may include a plurality of segments 302 (i.e., segments 302A-302E in FIG. 4 and segment 302A and 302B in FIG. 5), wherein each segment 302 comprises a pair of sensors 304A, 304B associated therewith (e.g., being bonded thereto). More specifically, each of the plurality of segments 302 comprises a first sensor 304A coupled to a first surface 306 and a second sensor 304B coupled to a second surface 308 of the structure 300, wherein the second surface 308 is opposite the first surface 306. It is noted that neither second surface 308 nor second sensor 304B are visible in the perspective view in FIG. 4; however, second surface 308 and second sensor 304B are visible in the depiction of structure 300 in FIG. 5. The sensors 304A, 304B may comprise a strain gauge. By way of example only, the structure 300 may comprise a flexible metal strip having a thickness D of approximately 0.7 inch. Although FIGS. 4 and 5 illustrate structure 300 including five segments and two segments, respectively, the present invention is not so limited and structure 300 may comprise any number of segments.

With continued reference to FIGS. 4 and 5, as will be understood by a person having ordinary skill in the art, as a segment (e.g., segment 302A) of structure 300 bends, sensor 304A and associated sensor 304B (see FIG. 5) may each measure a strain. More specifically, as an example, as segment 302A bends in one direction, sensor 304A may be stretched and a strain measured by sensor 304A may be determined. Furthermore, sensor 304B (see FIG. 5) may be compressed and a strain measured by sensor 304B may also be determined. After an amount of strain measured by each of sensor 304A and sensor 304B is determined, a curvature of an associated segment (e.g., segment 302A) at a moment in time may be determined according to methods known in the art. For example only, a curvature of associated segment 302A may be determined according to well-known beam deflection theory. Furthermore, the curvature of segment 302A may be integrated over a length L of segment 302A to determine a shape of segment 302A at a moment in time. Moreover, after determining a shape of every other segment 302 (i.e., segments 302B-302E) of structure 300 in a similar manner, a shape of structure 300 at a moment in time may be determined. Furthermore, a method for determining a shape of structure 300 at a moment in time may be repeated at a specific frequency to determine a shape of structure 300 as a function of time. Moreover, the shape of structure 300 may be used to determine a position of structure 300 relative to a known original position and original shape of structure 300.

Figure 6:
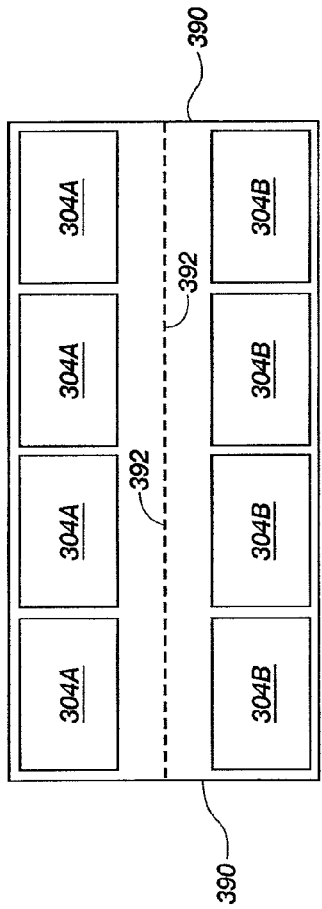
FIG. 6 illustrates a plurality of sensors integrated within a flex circuit, according to an embodiment of the present invention.

FIG. 6 illustrates a plurality of sensors 304A, 304B integrated within a flex circuit 390 according to an embodiment of the present invention. In other words, according to one embodiment illustrated in FIG. 6, sensors 304A, 304B and associated circuitry (e.g., Wheatstone bridges) may be integrated within a flex circuit 390, as will be understood by a person having ordinary skill in the art. In this embodiment, flex circuit 390 may be folded along a center line 392 and wrapped around and coupled to a structure 300.

Figure 7:
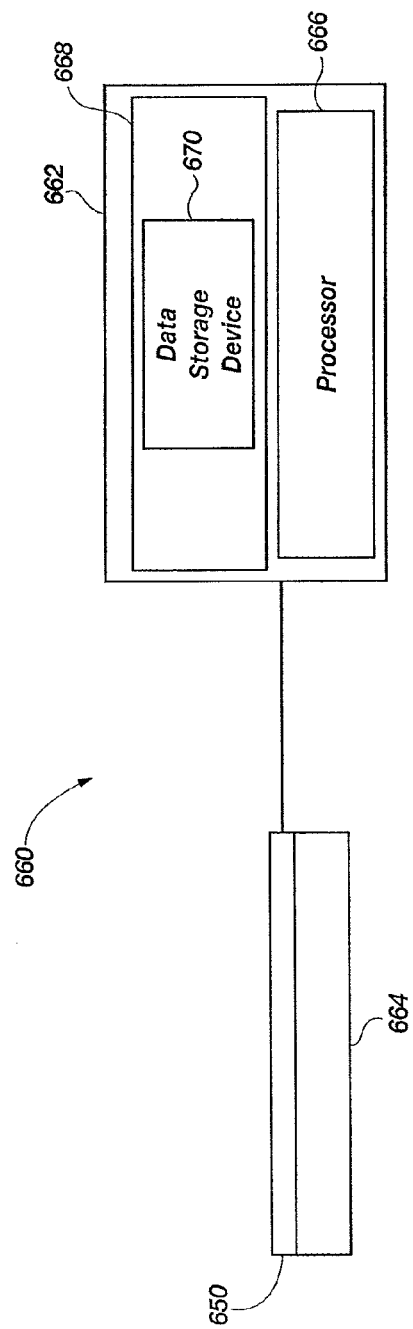
FIG. 7 illustrates a system including a computer operably coupled to a sensing device, in accordance with an embodiment of the present invention.

FIG. 7 illustrates a system 660 including a computer 662 operably coupled to sensing device 650 in accordance with an embodiment of the present invention. The sensing device 650 may include structure 300, sensors 304A, 304B, and associated circuitry, the examples of which are described with reference to FIGS. 3-5. The sensing device 650 may be positioned adjacent to and at least in substantial alignment with an object 664 for which a shape is to be determined. As described below, object 664 may comprise, for example only, an inhibitor within a rocket motor, a body part (e.g., a limb), a video game input device, or construction material (e.g., a piece of wood). It is noted that, depending on the application, sensing device 650 may be associated with object 664, including being positioned adjacent object 664, coupled to object 664, bonded to object 664, embedded within object 664, or any combination thereof. Computer 662 may include a processor 666 and a memory 668. Memory 668 may include a computer readable medium (e.g., data storage device 670), which may include, but is not limited to, magnetic and optical storage devices such as disk drives, magnetic tape, CDs, DVDs, and semiconductor devices such as RAM, DRAM, ROM, EPROM, and Flash memory. Memory 668 may include one or more software applications configured for performing various methods described herein. For example, memory 668 may include one or more software applications (e.g., instructions) configured for receiving data from sensing device 650 and, thereafter, computing one or more characteristics associated with object 664. For example, a shape of object 664, a position of object 664, a vibrational frequency of object 664, an erosion rate of object 664, and any harmonic frequencies associated with object 664 may each be computed, as described more fully below. One or more characteristics associated with the object 664 may also be transferred to the computer 662.

The devices, systems, and methods of the various embodiments described herein have a multitude of different applications. As non-limiting examples, the various embodiments of the present disclosure may be utilized within rocket motor applications, video gaming applications, construction applications, industrial process applications, and medical applications.

Figure 8:
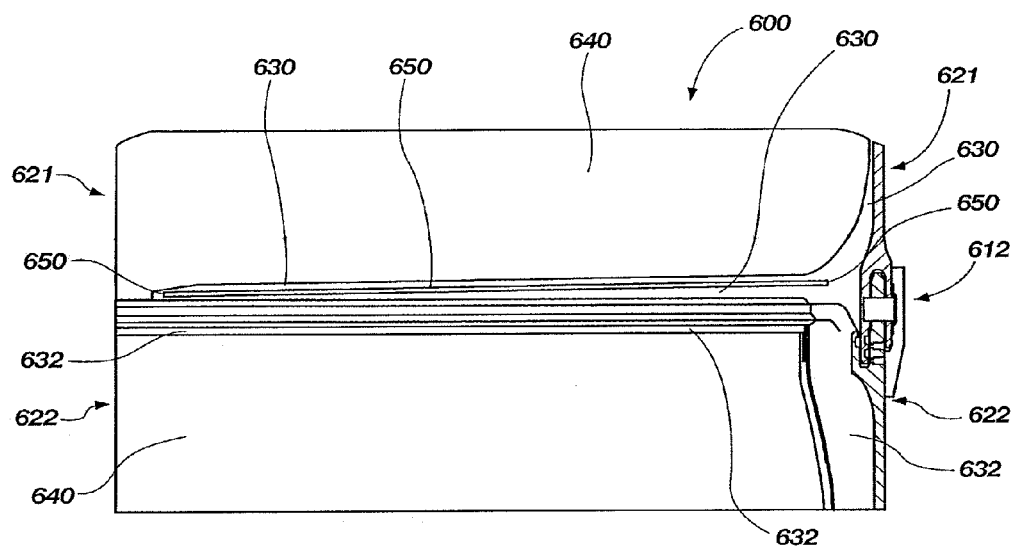
FIG. 8 is a cross-sectional view of a portion of a rocket motor having a sensing device embedded within an inhibitor, according to an embodiment of the present invention.
Figure 9:
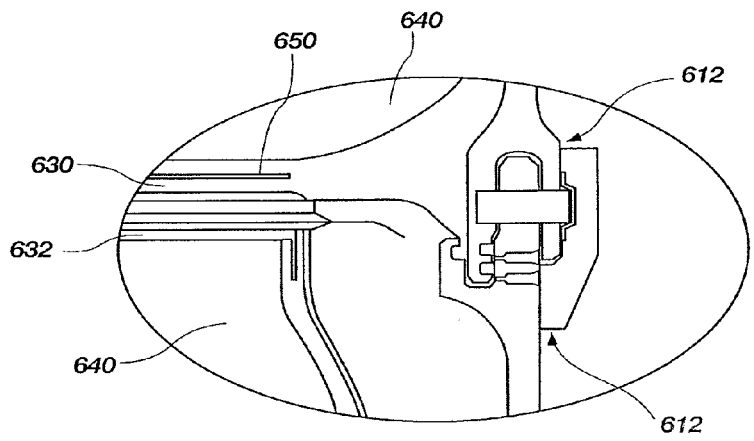
FIG. 9 is an enlarged cross-sectional view of a portion of the rocket motor of FIG. 8.

One non-limiting example application may comprise employing sensing device 650 to monitor one or more characteristics (e.g., a shape) of an inhibitor within a rocket motor (e.g., RSRM). FIG. 8 is a cross-sectional view of a portion of a rocket motor 600 according to an embodiment of the present invention. FIG. 9 is an enlarged cross-sectional view of a portion of the rocket motor 600 of FIG. 8. Referring to FIGS. 8 and 9 rocket motor 600 comprises a field joint 612 connecting a first segment 621 and a second segment 622. For example, first segment 621 may comprise a forward segment and second segment 622 may comprises a forward-center segment. Segments 621 and 622 may collectively contain a solid propellant grain structure, which is illustrated as a center-perforated propellant grain structure 640. More specifically, each of segments 621 and 622 may house a portion or segment of propellant grain structure 640. Also illustrated are first and second inhibitors 630, 632, each of which may be shaped as an annular radial disk. As will be understood by a person having ordinary skill in the art, the first inhibitor 630 may comprise a forward-facing field joint inhibitor. Furthermore, the first inhibitor 630 may comprise for example, a polybenzimidazole fiber reinforced nitrile butadiene rubber (PBI-NBR) inhibitor and second inhibitor 632 may comprise, for example, a castable inhibitor. FIG. 9 is a zoomed in, enlarged cross-sectional view of a portion of field joint 612 and first and second inhibitors 630, 632.

As further illustrated in FIGS. 8 and 9, sensing device 650 may be embedded within first inhibitor 630. As will be understood by person having ordinary skill in the art, first inhibitor 630 may comprise a plurality of viscoelastic material sheets in a layered arrangement, wherein each material sheet may be comprised of one of asbestos fiber reinforced nitrile butadiene rubber (ASNBR) and PBI-NBR. Accordingly, before first inhibitor 630 is cured, sensing device 650 may be positioned between adjacent material sheets of first inhibitor 630. Thereafter, a curing process (e.g., vulcanization) may be performed to embed sensing device 650 within first inhibitor 630. Sensing device 650 may be positioned (e.g., centered) between a top surface of first inhibitor 630 and a bottom surface of first inhibitor 630. Although not illustrated in FIG. 9, second inhibitor 632 may also include a sensing device embedded therein.

Figure 10:
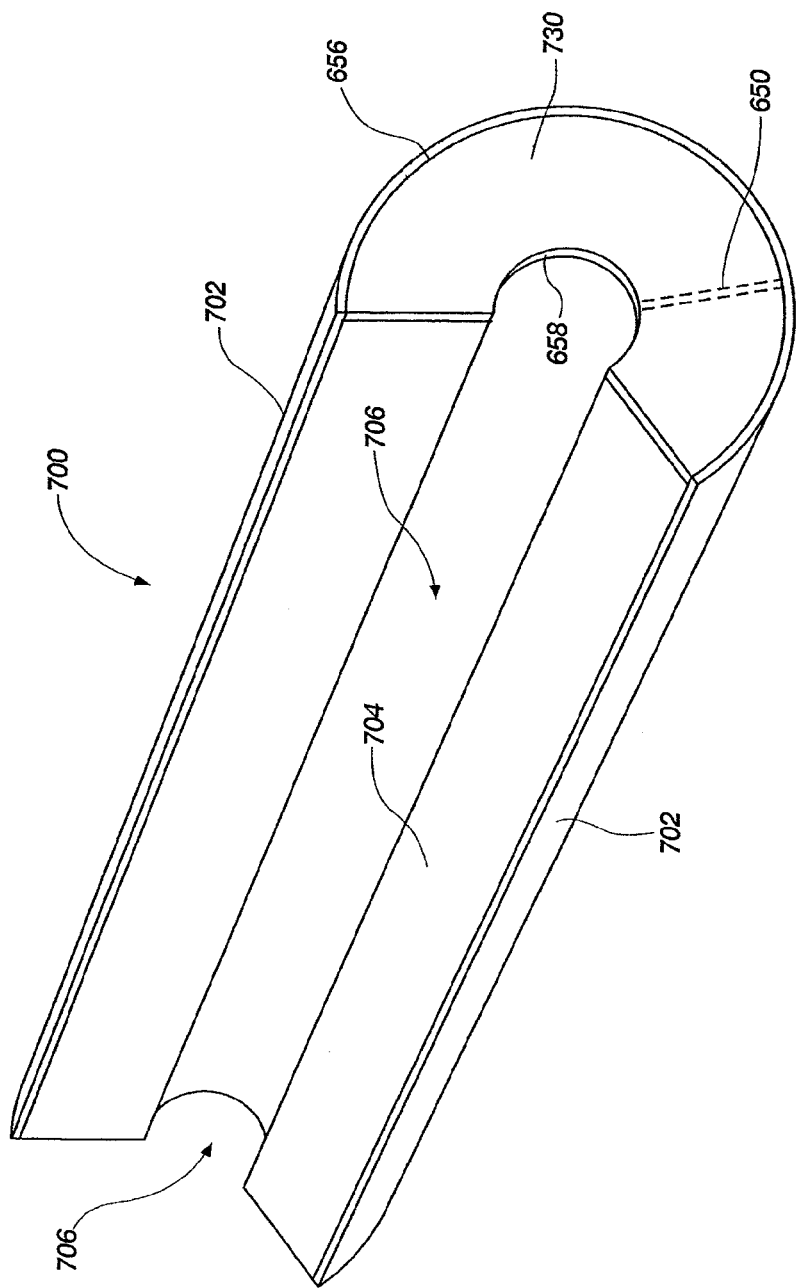
FIG. 10 is a perspective cut-away view of a portion of a rocket motor having a sensing device positioned within an inhibitor, in accordance with an embodiment of the present invention.
Figure 12:
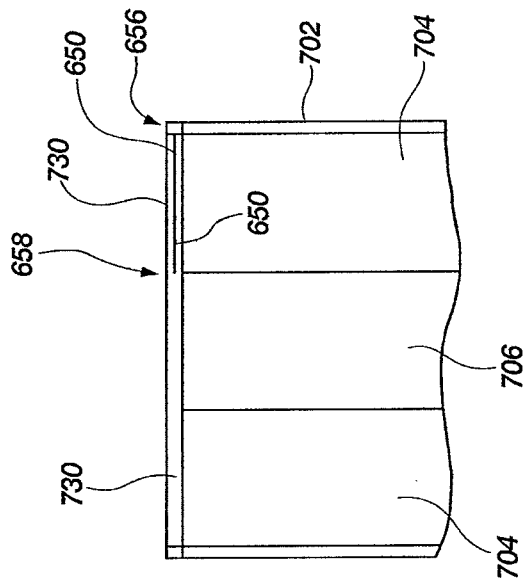
FIG. 12 is a cross-sectional view of a portion of the rocket motor of FIG. 10 having a sensing device positioned within an inhibitor, according to an embodiment of the present invention.
Figure 11:
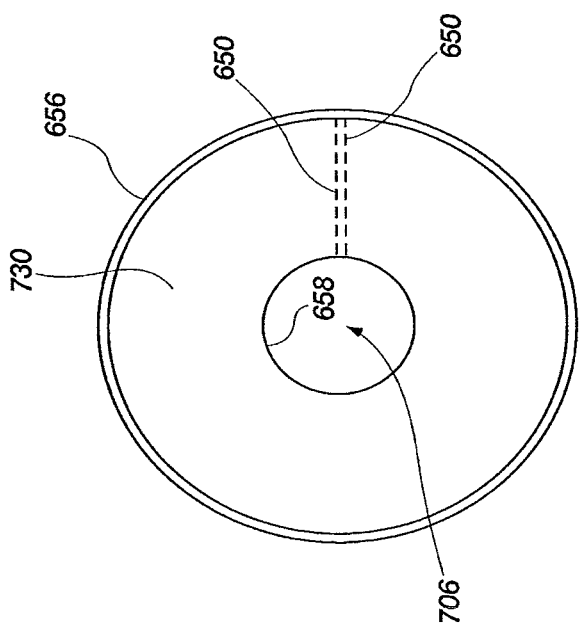
FIG. 11 illustrates a top-down view of the inhibitor of FIG. 10 with a sensing device positioned therein, according to an embodiment of the present invention.

FIG. 10 illustrates a perspective cut-away view of a portion of a rocket motor 700 including a sensing device 650 positioned within an inhibitor 730, in accordance with an embodiment of the present invention. The rocket motor 700 includes a casing 702 and a propellant 704 with an aperture 706 extending therethrough. Portion of rocket motor 700 also includes an inhibitor 730, which may comprise first inhibitor 630 illustrated in FIGS. 8 and 9. Furthermore, sensing device 650, which is embedded within inhibitor 730, is also illustrated. FIG. 11 illustrates a top-down view of the inhibitor 730 of FIG. 10 with sensing device 650 positioned therein, according to an embodiment of the present invention. FIG. 12 is a cross-sectional view of a portion of rocket motor 700 of FIG. 10 having a sensing device 650 positioned within inhibitor 730, according to an embodiment of the present invention. As illustrated in each of FIGS. 10-12, sensing device 650 may extend from an outer radial edge 656 of inhibitor 730 to an inner radial edge 658 of inhibitor 730.

Figure 13:
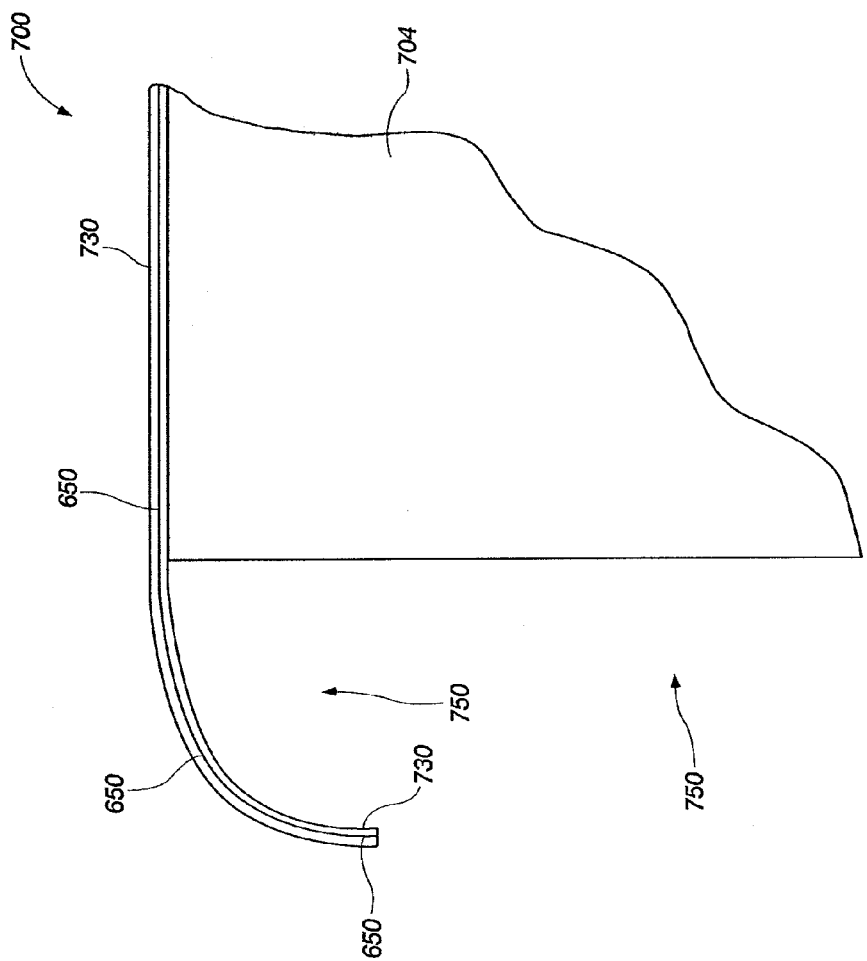
FIG. 13 is another illustration of a portion of a rocket motor having a sensing device positioned within an inhibitor adjacent a propellant, in accordance with an embodiment of the present invention.

FIG. 13 is another illustration of a portion of rocket motor 700 including sensing a device 650 positioned within inhibitor 730 adjacent a propellant 704, in accordance with an embodiment of the present invention. It is noted that FIG. 13 illustrates portion of rocket motor 700 after a portion of a propellant (e.g., propellant 704) has been depleted (e.g., burned, consumed, etc.). Reference numeral 750 illustrates an area (i.e., a void) that had previously comprised propellant 704. As a result of the propellant being depleted, a portion of inhibitor 730 adjacent area 750 may be unsupported. Therefore, a portion of inhibitor 730 adjacent area 750 may be displaced within an aperture of rocket motor 700 and may cause undesired oscillations within rocket motor 700. More specifically, as an example, vortex shedding from inhibitor 730 may result in oscillations in the combustion chamber of rocket motor 700 that may undesirably shake an associated orbiter. As will be understood by a person having ordinary skill in the art, a shape and a position of sensing device 650 may be dependent on a shape and a position of inhibitor 730. Stated another way, each of a shape and a position of sensing device 650 may be similar, or identical, to that of inhibitor 730. Accordingly, by measuring a shape of sensing device 650, a shape of inhibitor 730 may be determined. Furthermore, a relative position of inhibitor 730 may be determined by determining a relative position of sensing device 650.

As noted above with respect to FIGS. 4 and 5, a method for determining a shape of a structure may be repeated at a certain frequency to determine a shape of the structure as a function of time. With reference to FIG. 13, by employing the methods described above, a shape of sensing device 650 and, therefore, a shape of inhibitor 730 as a function of time may be determined. Furthermore, according to methods known in the art, a vibrational frequency of inhibitor 730 may be determined from the shape of sensing device 650 as a function of time. As one example, a vibrational frequency of inhibitor 730 may be mathematically determined from the shape of sensing device 650 as a function of time and a known measurement rate (i.e., the frequency at which measurements are taken). As another example, a vibrational frequency of inhibitor 730 may be determined by visually observing the shape of inhibitor 730 as a function of time. Furthermore, for example, a Fourier transform may be performed on the time-domain data (i.e., the shape of inhibitor 730 as a function of time) to generate frequency spectra, which may be used to determine a vibrational frequency and any harmonic frequencies associated with inhibitor 730 that may exist.

Furthermore, as a propellant (e.g., propellant 704) within a rocket motor is depleted (e.g., burns), a portion of an inhibitor (e.g., inhibitor 730) and adjacent portions of sensing device 650 may also burn and disintegrate. With reference to FIGS. 4, 5, and 13, as segment 302A burns and possibly disintegrates, associated sensors 304A and 304B may also disintegrate and, therefore, may not produce accurate measurements, if any measurements at all. Accordingly, an erosion rate of inhibitor 730 may be determined by monitoring a loss of measured data from sensing device 650. Stated another way, as a pair of associated sensors (i.e., sensors 304A and 304B) within a segment (e.g., segment 302A) of sensing device fail to produce data, it may be assumed that the sensors and the segment, as well as the portion of the inhibitor, which was previously adjacent to the sensors, has burned and disintegrated.

Various embodiments, as described above, may enable for one or more characteristics of an inhibitor within a combustion chamber of a rocket motor to be monitored. Accordingly, it may be possible to better understand why and how one or more characteristics of the inhibitor affect, and possibly cause, oscillations within a rocket motor. For example, embodiments of the present invention may enable one to determine if, and possibly how, a shape and/or the flexibility of an inhibitor affects oscillations within a rocket motor. With a better understanding of a relationship between inhibitors and oscillations within a rocket motor, inhibitor designs may be modified in an effort to minimize the oscillations.

As noted above, the devices, systems, and methods of the various embodiments described herein have a multitude of different applications in addition to the rocket motor applications described above. One contemplated application of embodiments of the present disclosure is in video gaming. For example, sensing device 650 may be utilized to determine a position and a direction of an input device (e.g., a game controller) relative to a fixed reference.

Figure 14:
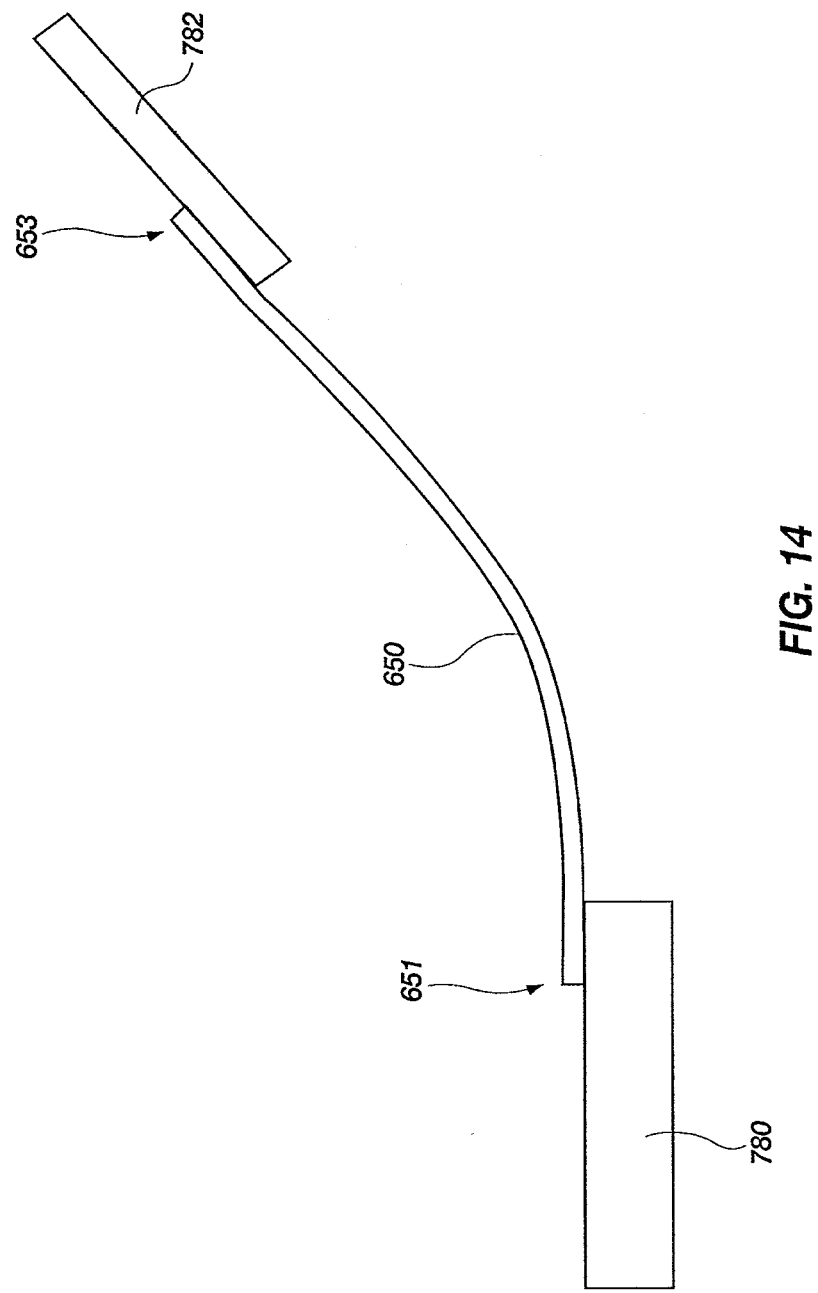
FIG. 14 illustrates a sensing device coupled to a game controller, according to an embodiment of the present invention.

For example, FIG. 14 illustrates a sensing device 650 coupled to a game controller 782, according to an embodiment of the present invention. A first end 651 of sensing device 650 may be coupled to a stationary reference 780, such as a video game console, and a second end 653 of sensing device 650 may be coupled to a game controller 782 (e.g., a sword). The position and orientation of game controller 782 may then be determined by integrating a measured curvature of sensing device 650 from first end 651 of sensing device 650 to second end 653 of sensing device 650.

Figure 15:
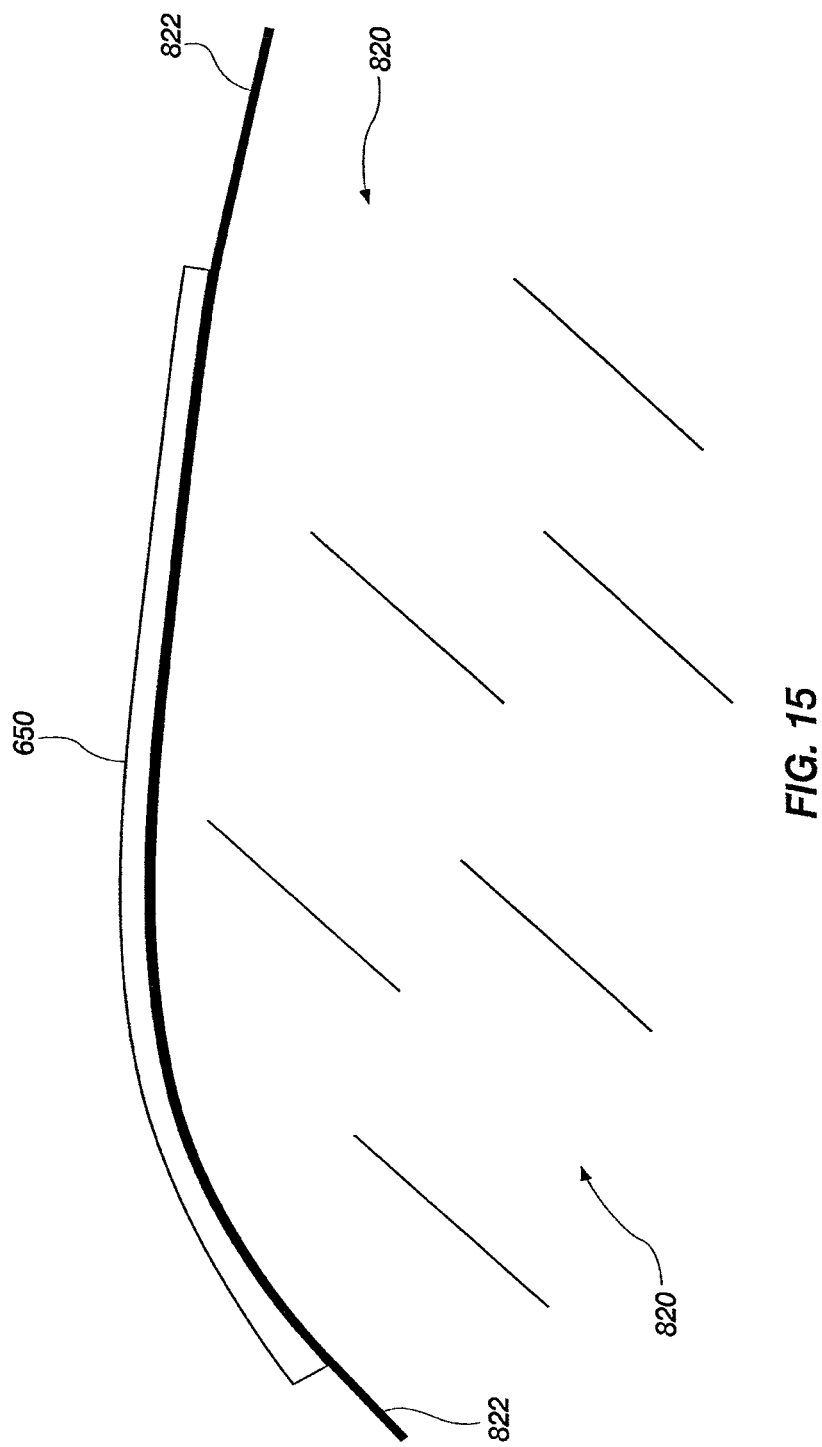
FIG. 15 illustrates a sensing device positioned adjacent to and at least in substantial alignment with a surface of an object, in accordance with an embodiment of the present invention.

As another example, embodiments of the invention may be utilized within medical applications. FIG. 15 illustrates sensing device 650 positioned adjacent to and at least in substantial alignment with a surface 822 of an object 820, in accordance with an embodiment of the present invention. In one example in which object 820 comprises a limb (e.g., an arm or a leg), sensing device 650 may be used to determine a range of motion of the limb. In another example in which object 820 comprises a chest of a living being, sensing device 650 may be used to monitor breathing patterns by measuring a geometry of the chest over time. Other contemplated examples may include utilizing sensing device 650 for measuring muscle contractions or a curvature of a spine. Moreover, sensing device 650 may used to monitor characteristics (e.g., shape and position) of a surgeon's hand while performing surgery.

In addition, embodiments of the present invention may be employed to transfer a contour of a real world object to a computer (e.g., computer 662). For example, with reference again to FIG. 15, sensing device 650 may be positioned on surface 822 of object 820 (e.g., a curved piece of wood) in a manner so that a contour of sensing device 650 at least substantially matches a contour of object 820. The shape of sensing device 650 and, thus, the contour of the object 820 may then be transferred to a computer. Similarly, sensing device 650 may be used to transfer a contour of a virtual object to a real world object. For example, sensing device 650 may be placed on a real world object (e.g., a board or a piece of cloth) and positioned in a manner to match a contour of a virtual object displayed on a computer screen. It is noted that the computer may include software configured to inform a user when a contour of sensing device 650 matches a contour of a virtual object. After tracing the contour of sensing device 650 onto the real world object, the real world object may be cut accordingly. As yet another example, sensing device 650 may be used for angle measurements in the construction industry.

Specific embodiments have been shown by way of example in the drawings and have been described in detail herein; however, the invention may be susceptible to various modifications and alternative forms. It should be understood that the invention is not intended to be limited to the particular forms disclosed. Rather, the invention includes all modifications, equivalents, and alternatives falling within the scope of the invention as defined by the following appended claims, and their legal equivalents.

What is claimed is:

1. A device, comprising:
   a substantially planar structure having a first side and a second side opposite the first side;
   a first plurality of sensors coupled along the first side of the structure;
   a second plurality of sensors coupled along the second side of the structure, each sensor of the first plurality of sensors having an opposing associated sensor of the second plurality of sensors, wherein each sensor of the first and second plurality of sensors is configured to measure a strain exhibited by at least a portion of the structure; and
   a processor configured to determine at least one characteristic of the structure based on strain data from the first and second plurality of sensors, wherein the at least one characteristic of the structure includes a vibrational frequency of the structure.

2. The device of claim 1, wherein the at least one characteristic of the structure further includes a shape of at least one segment of the structure at a moment in time.

3. The device of claim 2, wherein the processor is configured to determine the shape of the at least one segment of the structure at a moment in time by integrating curvature over a length of the structure.

4. The device of claim 1, wherein the processor is configured to determine a shape of the structure as a function of time.

5. The device of claim 1, further comprising an object to which the structure is coupled.

6. The device of claim 5, wherein the object includes a composite component for an aerospace vehicle.

7. The device of claim 6, wherein the aerospace vehicle includes a solid rocket motor.

8. The device of claim 7, wherein the composite component includes an inhibitor of the solid rocket motor.

9. The device of claim 6, wherein the aerospace vehicle includes a spacecraft vehicle.

10. The device of claim 1, wherein the substantially planar structure includes a flexible metal strip.

11. A device, comprising:
a structure having a first side and a second side opposite the first side;
a first plurality of sensors coupled along the first side of the structure;
a second plurality of sensors coupled along the second side of the structure, each sensor of the first plurality of sensors having an associated sensor of the second plurality of sensors, wherein each sensor of the first and second plurality of sensors is configured to measure a strain exhibited by at least a portion of the structure; and
a processor configured to determine at least one characteristic of the structure based on strain data from the first and second plurality of sensors, wherein the structure is configured as a flex circuit such that the first side and the second side are on a same surface of the structure that is folded along a center line to form the first side and the second side that oppose each other.

12. A method, comprising:
positioning a substantially planar structure adjacent to an object, the structure having a first side with a first plurality of sensors coupled thereto and a second side with a second plurality of sensors coupled thereto, wherein the second side is opposite the first side, and each sensor of the first plurality of sensors has an opposing associated sensor of the second plurality of sensors;
obtaining data from the first plurality of sensors and the second plurality of sensors that is indicative of strain on the structure; and
determining at least one characteristic of the object based on the data obtained from the first plurality of sensors and the second plurality of sensors, wherein determining the at least one characteristic of the object includes determining harmonic frequencies associated with the shape of the object as a function of time.

13. The method of claim 12, wherein determining the at least one characteristic of the object includes determining a shape of the object as a function of time by repeating individual measurements at a predetermined frequency.

14. The method of claim 12, wherein determining harmonic frequencies includes performing a Fourier transform on time-domain data obtained from repeating the individual measurements at the predetermined frequency.

15. The method of claim 12, wherein positioning a substantially planar structure adjacent an object includes at least one of:
coupling the substantially planar structure to the object;
bonding the substantially planar structure to the object; and
embedding the substantially planar structure within the object.

16. The method of claim 12, wherein determining the at least one characteristic associated with the object includes determining a vibrational frequency of the structure.

17. The method of , claim 16, wherein positioning the structure adjacent to an object includes positioning the structure adjacent to a construction material.

18. The method of claim 12, wherein positioning a substantially planar structure adjacent to an object includes positioning the substantially planar structure adjacent to a composite component for an aerospace vehicle.

19. The device of claim 18, wherein the aerospace vehicle includes a solid rocket motor.

20. A method, comprising:
positioning a substantially planar structure adjacent to an object, the structure having a first side with a first plurality of sensors coupled thereto and a second side with a second plurality of sensors coupled thereto, wherein the second side is opposite the first side, and each sensor of the first plurality of sensors has an opposing associated sensor of the second plurality of sensors;
obtaining data from the first plurality of sensors and the second plurality of sensors that is indicative of strain on the structure;
determining at least one characteristic of the object based on the data obtained from the first plurality of sensors and the second plurality of sensors;
comparing a determined shape of the structure against a predetermined virtual shape on a computer;
manipulating the object to alter the shape of the object; and
informing a user when the determined shape of the object at least substantially matches the predetermined virtual shape.

21. The method of claim 20, wherein positioning a substantially planar structure adjacent to an object includes positioning the substantially planar structure adjacent to a composite component for an aerospace vehicle.

22. A method, comprising:
positioning a substantially planar structure adjacent to an object, the structure having a first side with a first plurality of sensors coupled thereto and a second side with a second plurality of sensors coupled thereto, wherein the second side is opposite the first side, and each sensor of the first plurality of sensors has an opposing associated sensor of the second plurality of sensors;
obtaining data from the first plurality of sensors and the second plurality of sensors that is indicative of strain on the structure; and
determining at least one characteristic of the object based on the data obtained from the first plurality of sensors and the second plurality of sensors, wherein determining the at least one characteristic associated with the object includes determining an erosion rate of the structure.

23. The method of claim 22, wherein determining the erosion rate includes monitoring a loss of measured data from the first plurality of sensors and the second plurality of sensors.

24. The method of claim 22, wherein positioning a substantially planar structure adjacent to an object includes positioning the substantially planar structure adjacent to a composite component for an aerospace vehicle.

25. The device of claim 24, wherein the aerospace vehicle includes a solid rocket motor of a spacecraft vehicle.

* * * * *